(12) United States Patent
Liao (10) Patent No.: US 11,408,514 B2
(45) Date of Patent: Aug. 9, 2022

(54) CONSTANT GAS FLOW VALVE STRUCTURE OF TOY GUN MAGAZINE

(71) Applicant: GUAY GUAY TRADING CO., LTD., Changhua County (TW)

(72) Inventor: Yin-Hsi Liao, Changhua County (TW)

(73) Assignee: GUAY GUAY TRADING CO., LTD., Changhua County (TW)

( * ) Notice: Subject to any disclaimer, the term of this patent is extended or adjusted under 35 U.S.C. 154(b) by 49 days.

(21) Appl. No.: 17/124,460

(22) Filed: Dec. 16, 2020

(65) Prior Publication Data

US 2022/0042604 A1 Feb. 10, 2022

(30) Foreign Application Priority Data

Aug. 7, 2020 (TW) .................................. 109210226

(51) Int. Cl.
   *F16K 1/30* (2006.01)
   *F41B 11/723* (2013.01)
   *F16K 1/52* (2006.01)

(52) U.S. Cl.
   CPC .............. *F16K 1/303* (2013.01); *F16K 1/523* (2013.01); *F41B 11/723* (2013.01)

(58) Field of Classification Search
   CPC .......... F16K 1/523; F16K 1/303; F16K 1/306; F41B 11/723; F41B 11/72; F41B 11/62; F41B 11/56
   USPC ....... 251/339, 284–285, 320, 319, 321, 322, 251/323, 333
   See application file for complete search history.

(56) References Cited

U.S. PATENT DOCUMENTS

| | | | | |
|---|---|---|---|---|
| 2,635,623 A | * | 4/1953 | Moffett | B60S 5/043 137/625.5 |
| 5,421,552 A | * | 6/1995 | Wang | E03C 1/052 251/295 |
| 6,076,804 A | * | 6/2000 | Cabrera | F16K 41/12 137/903 |
| 6,810,870 B1 | * | 11/2004 | Hu | F41B 11/721 124/76 |
| 7,237,543 B2 | * | 7/2007 | Su | F41B 11/724 124/71 |
| 7,415,977 B2 | * | 8/2008 | Chen | F41B 11/723 124/52 |
| 7,540,280 B2 | * | 6/2009 | Liao | F41B 11/62 124/73 |

(Continued)

*Primary Examiner* — Mary E McManmon
*Assistant Examiner* — Andrew J Rost
(74) *Attorney, Agent, or Firm* — Muncy, Geissler, Olds & Lowe P.C.

(57) ABSTRACT

A toy gun magazine constant gas flow valve structure is coupled with a magazine of a pneumatic toy gun and structurally includes a gas valve body fixed in the magazine and includes a gas inlet end portion, a gas discharge portion, and a coupling end portion, a driving rod movably disposed in the gas valve body, a control member coupled with one end of the driving rod, a stroke limiting trough having a front limiting portion and a rear limiting portion, and a stop element. Before the toy gun is firing, the stop element abuts the front limiting portion to control the extent by which the driving rod presses against the leak-sealing element and after the firing of the toy gun, the stop element abuts the rear limiting portion to control the extent of opening of the gas inlet end portion and the gas discharge portion.

8 Claims, 8 Drawing Sheets

(56) References Cited

U.S. PATENT DOCUMENTS

| | | | | |
|---|---|---|---|---|
| 7,686,004 | B2* | 3/2010 | Gan | F41B 11/721 |
| | | | | 124/75 |
| 8,567,379 | B2* | 10/2013 | Hu | F41B 11/89 |
| | | | | 124/56 |
| 10,352,647 | B1* | 7/2019 | Wei | F41B 11/62 |
| 10,408,562 | B2* | 9/2019 | Liao | F41B 11/50 |
| 2006/0201491 | A1* | 9/2006 | Wei | F41B 11/56 |
| | | | | 124/74 |
| 2006/0207584 | A1* | 9/2006 | Yeh | F41B 11/62 |
| | | | | 124/45 |
| 2014/0263686 | A1* | 9/2014 | Hedger | B05B 7/2497 |
| | | | | 239/526 |
| 2014/0263699 | A1* | 9/2014 | Hedger | B29B 7/761 |
| | | | | 239/8 |
| 2018/0164069 | A1* | 6/2018 | Huang | F41B 11/68 |

* cited by examiner

CONSTANT GAS FLOW VALVE STRUCTURE OF TOY GUN MAGAZINE

TECHNICAL FIELD OF THE INVENTION

The present invention relates to a constant gas flow valve structure of a toy gun magazine, and more particularly to a constant gas flow valve structure of a toy gun magazine that can precisely control a stroke of a driving rod to achieve advantages of enhancing airtight sealing effect of a gas inlet end, preventing permanent deformation of a leak-sealing element, and stabilizing discharge gas flow.

DESCRIPTION OF THE PRIOR ART

An imitative pneumatically-driven gun uses a gas valve to control whether to discharge pressurized gas or not. Thus, the airtight sealing performance of a gas inlet end of the valve is of vital importance. A driving rod sets a leak-sealing element at the gas inlet end in a sealed state and a released state respectively before and after firing. Thus, after each firing, the driving rod perform re-sealing of the leak-sealing element. The performance of airtight sealing is affected if the elasticity of the leak-sealing element goes down. However, the pressurized gas still causes the driving rod to carry out sealing of the leak-sealing element before each of the subsequent rounds of firing. Heretofore, the only resolution is to try to get balanced between making selection for proper stiffness of the material of the leak-sealing element and the service life thereof. However, even for leak-sealing elements of the same part number, there is a difference of elasticity when they are manufactured, so that the pressurized gas input at each time may be of different pressure. In other words, such a balance may be hard to achieve. A softer element, which undertakes significant deformation during an extended period of use, may eventually become permanently deformed, while a stiffer leak-sealing element may difficultly achieve desired airtight sealing and may cause wearing and abrasion of the driving rod.

Further, at the moment of firing, a hammer forcibly strikes a control member to activate the driving rod. Generally, a spring inside the gas valve is used to limit the amplitude of displacement of the control member and the driving rod. However, the striking force of the hammer and cushioning and position limiting provided by the spring are all related to the spring force and it is hard to precisely control a discharge quantity achieved with the control member and the driving rod. Further, the rate of gasification of the gas is affected by temperature, and it is necessary to regulate the size of a gas discharge orifice in different environments.

SUMMARY OF THE INVENTION

The primary objective of the present invention is that a stop element and a stroke limiting trough are used to precisely control a stroke of the control member and the driving rod in order to limit the maximum level by which a driving rod presses against a leak-sealing element and to stabilize the minimum discharge quantity of a gas valve.

To achieve the above objective, the present invention is provided for coupling with a magazine of a pneumatic toy gun and comprises, structurally, a gas valve body, a driving rod, a leak-sealing element, a control member, at least one stroke limiting trough, and at least one stop element. The gas valve body is fixed in the magazine and comprises a gas inlet end portion, a gas discharge portion, and a coupling end portion. The gas discharge portion is formed at one side of the gas inlet end portion and is set in communication therewith. The coupling end portion is formed at one side of the gas discharge portion for coupling with the magazine. The driving rod is movably disposed in the gas valve body and is connected to one side of the gas inlet end portion. The leak-sealing element is arranged on the gas inlet end portion and collaborates with the driving rod in closing the gas inlet end portion. The control member is movably disposed in the gas valve body and is connected to an end of the driving rod that is distant from the leak-sealing element. The stroke limiting trough is formed on the control member and comprises a front limiting portion and a rear limiting portion. The front limiting portion is defined on a sidewall of the driving rod that is adjacent to the stroke limiting trough. The rear limiting portion is defined on another sidewall of the stroke limiting trough that is distant from the driving rod. The stop element is disposed on the coupling end portion and projects into the stroke limiting trough.

When a user mounts the present invention in the magazine of the pneumatic toy gun, before a firing of the pneumatic toy gun, the stop element abuts the front limiting portion of the stroke limiting trough to limit the extent that the control member is pushed outwards by the pressurized gas, and thus controlling a maximum level of the driving rod pressing against the leak-sealing element to prevent the leak-sealing element from being over-compressed for an extended period of time by a pressing force applied by the pressurized gas and thus resulting in elastic fatigue, and the leak-sealing element can be kept to operate in a proper range of extension and compression to ensure excellent airtight sealing effect and extend service life. Further, the stop element is arranged such that when the pneumatic toy gun is firing, the stop element abuts the rear limiting portion of the stroke limiting trough to limit the extent of inward movement of the control member as being driven by a hammer and thus, with the gas inlet end portion and the gas discharge portion being not blocked, a minimum quantity of air discharging can be ensured, and the purpose of stabilizing firing strength can be achieved.

With the technique described above, the drawbacks of a conventional gas valve body of a pneumatic toy gun that no mechanism is provided to control a stroke of a driving rod and the airtight sealing effect and the egress flow are unstable can be overcome to achieve the above advantages.

DETAILED DESCRIPTION OF THE PREFERRED EMBODIMENT

Referring collectively to FIGS. 1-7, the drawings clearly show that the present invention is mountable to a magazine 71 of a pneumatic toy gun 7, and has a structure that mainly comprises:

a gas valve body 1 fixed in an interior of the magazine 71, the gas valve body 1 comprising a gas inlet end portion 11, a gas discharge portion 12 formed at one side of and in communication with the gas inlet end portion 11, and a coupling end portion 13 formed at one side of the gas discharge portion 12 for coupling with the magazine 71;

at least one receiving compartment 111 formed in the gas inlet end portion 11, the receiving compartment 11*l* having a bottom that is formed with a gas inlet opening 112;

at least one receiving groove 134 formed in the coupling end portion 13, the receiving groove 134 having a bottom that is formed with a through-aperture portion 131 and a bearing portion 135 formed outside the through-aperture portion 131;

a driving rod 2 movably disposed in the gas valve body 1 and connected to one side of the gas inlet end portion 11, one end of the driving rod 2 including a force-receiving portion 23 and a screwing portion 24 formed as projecting from the force-receiving portion 23, a thread-free buffering portion 25 being provided between the force-receiving portion 23 and the screwing portion 24;

a leak-sealing element 3 arranged in the through-aperture portion 131 of the gas inlet end portion 11 and collaborating with the driving rod 2 in closing the gas inlet end portion 11, the leak-sealing element 3 being embedded in the receiving compartment 111, the leak-sealing element 3 being formed with a through hole 31 in communication with the gas inlet opening 112;

a control member 4 movably disposed in the gas valve body 1 and connected to an end of the driving rod 2 that is distant from the leak-sealing element 3, an end of the control member 4 connected to the driving rod 2 including a screwing cavity 42 that corresponds to and is combinable with the screwing portion 24, the force-receiving portion 23 being positionable against an opening of the screwing cavity 42, the screwing cavity 42 having a depth that is greater than a length of the screwing portion 24, a screwing buffer section 43 being formed in the screwing cavity 42;

at least one stroke limiting trough 41 formed on the control member 4, the stroke limiting trough 41 comprising a front limiting portion 411 formed on a sidewall and a rear limiting portion 412 formed on an opposite sidewall; and at least one stop element 5 disposed on the coupling end portion 13 and projecting into the stroke limiting trough 41 to get contactable with the front limiting portion 411 or the rear limiting portion 412 to control movement of the driving rod 2, the stop element 5 comprising a stop head 51 that is born on and supported by the bearing portion 135 and a stop 5 projection 52 formed at one end of the stop head 51, a first airtight element 61 being arranged at one side of the stop head 51 that is distant from the stop projection 52, the stop projection 52 being received in and extending through the through-aperture portion 131 to be located in the stroke limiting trough 41.

Based on the description provided above, the structure of the present invention can be fully understood. Through collaborative arrangement of the structure, the stroke or movement of the driving rod 2 can be accurately and precisely controlled and advantages of enhancing airtight sealing effect of the gas inlet end, preventing permanent deformation of the leak-sealing element 3, and stabilizing discharge gas flow can be achieved. Further details are provided in the following description.

Figure 1:
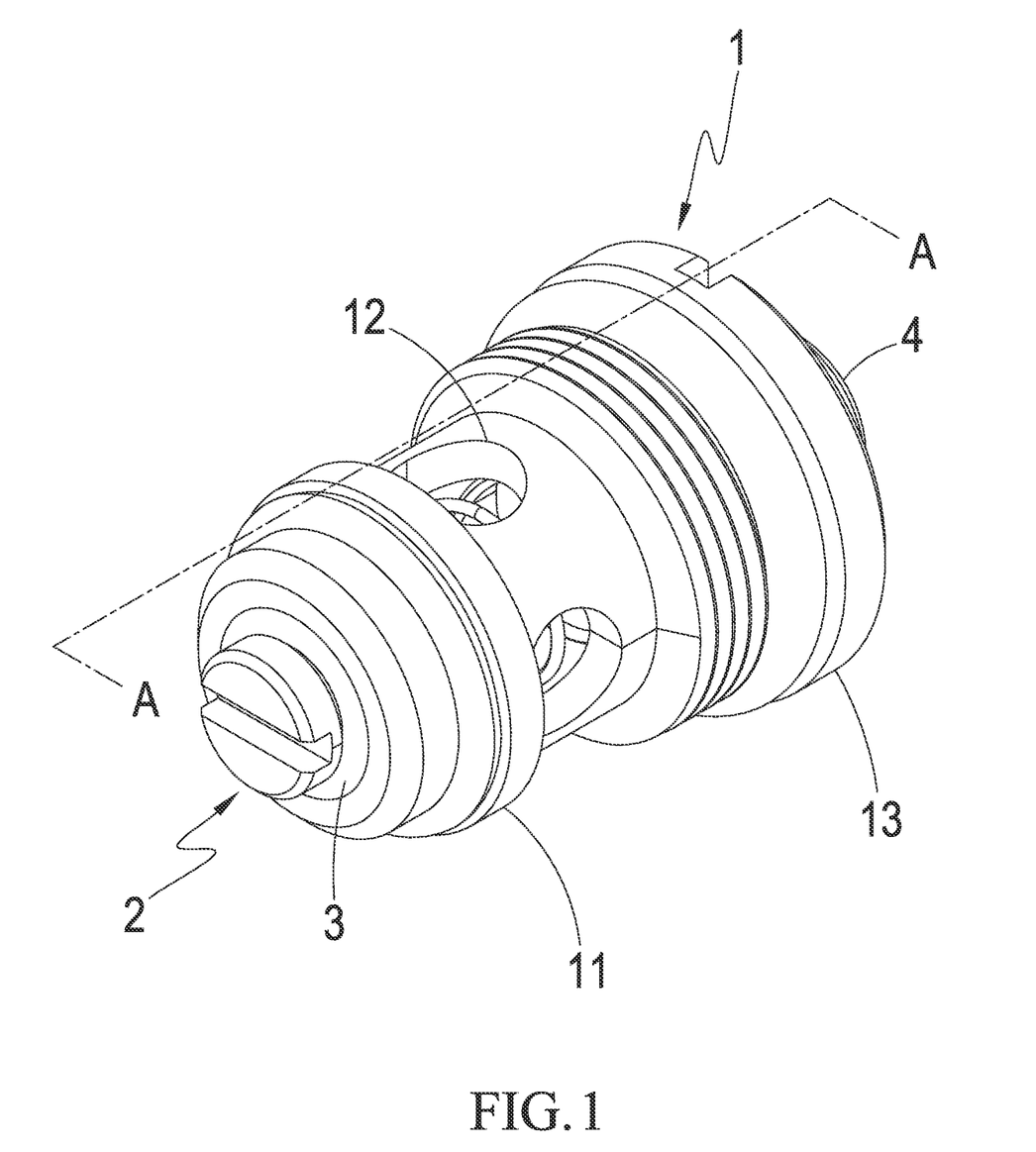
FIG. 1 is a perspective view showing a preferred embodiment of the present invention.
Figure 2:
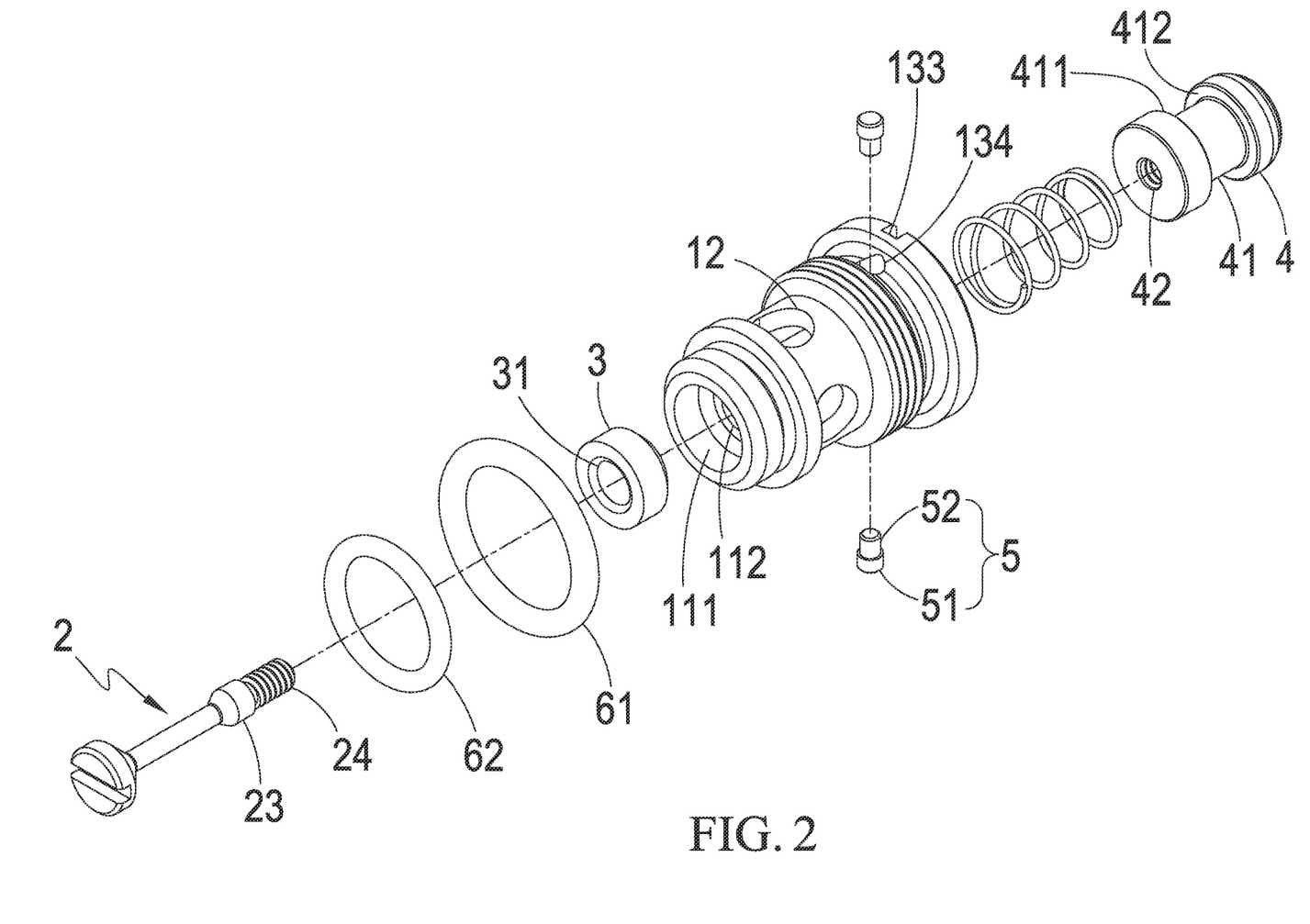
FIG. 2 is an exploded view showing the preferred embodiment of the present invention.
Figure 3:
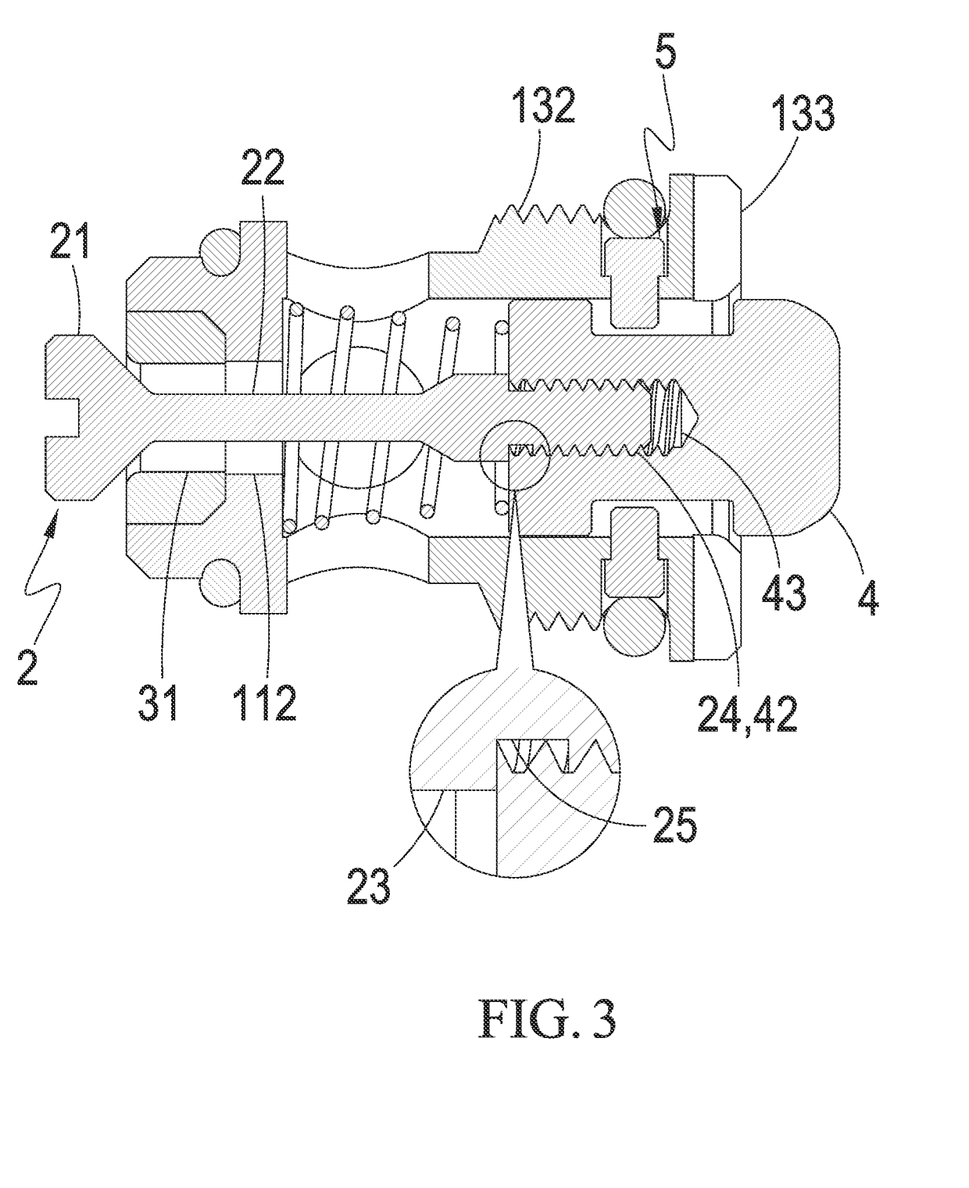
FIG. 3 is a cross-sectional view of the preferred embodiment of the present invention taken along line A-A of FIG. 1.
Figure 4:
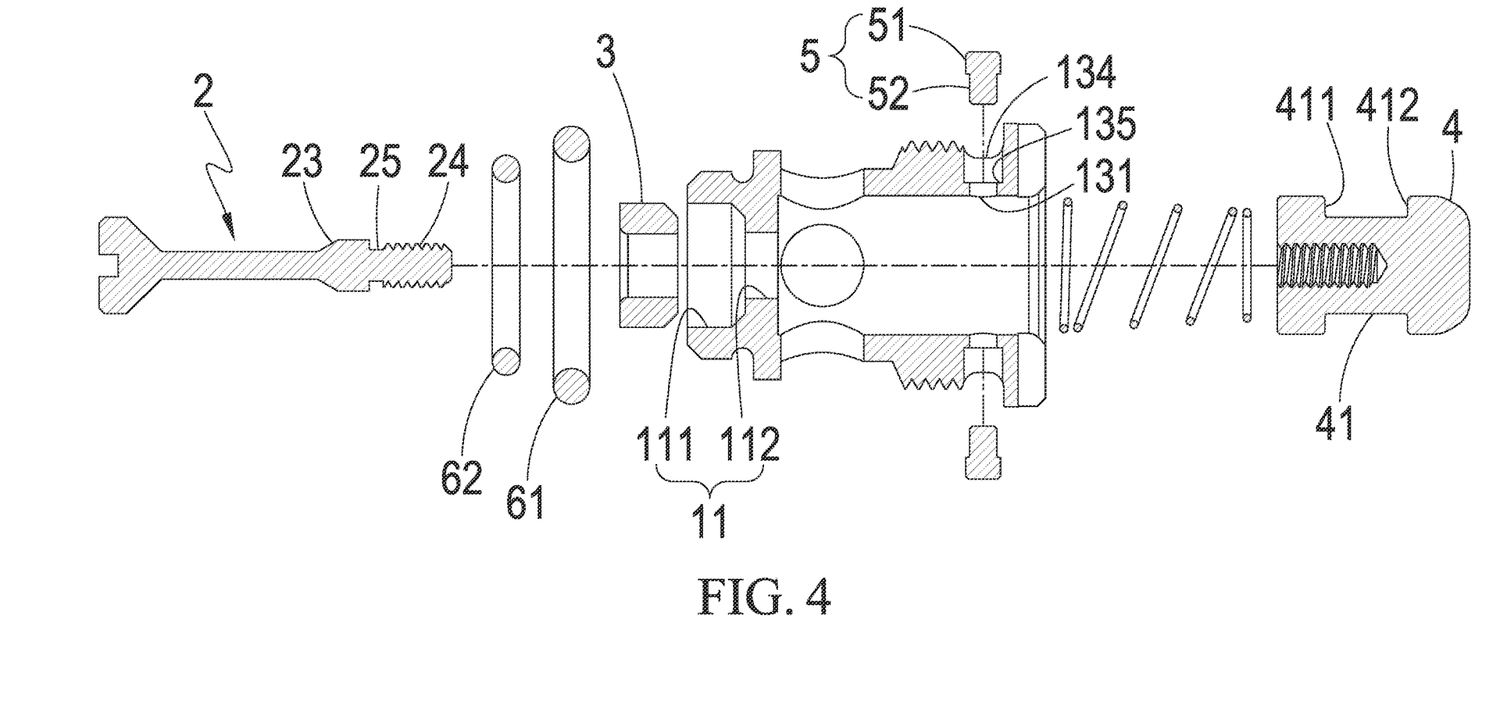
FIG. 4 is an exploded view, in a sectioned form, showing the preferred embodiment of the present invention.
Figure 5:
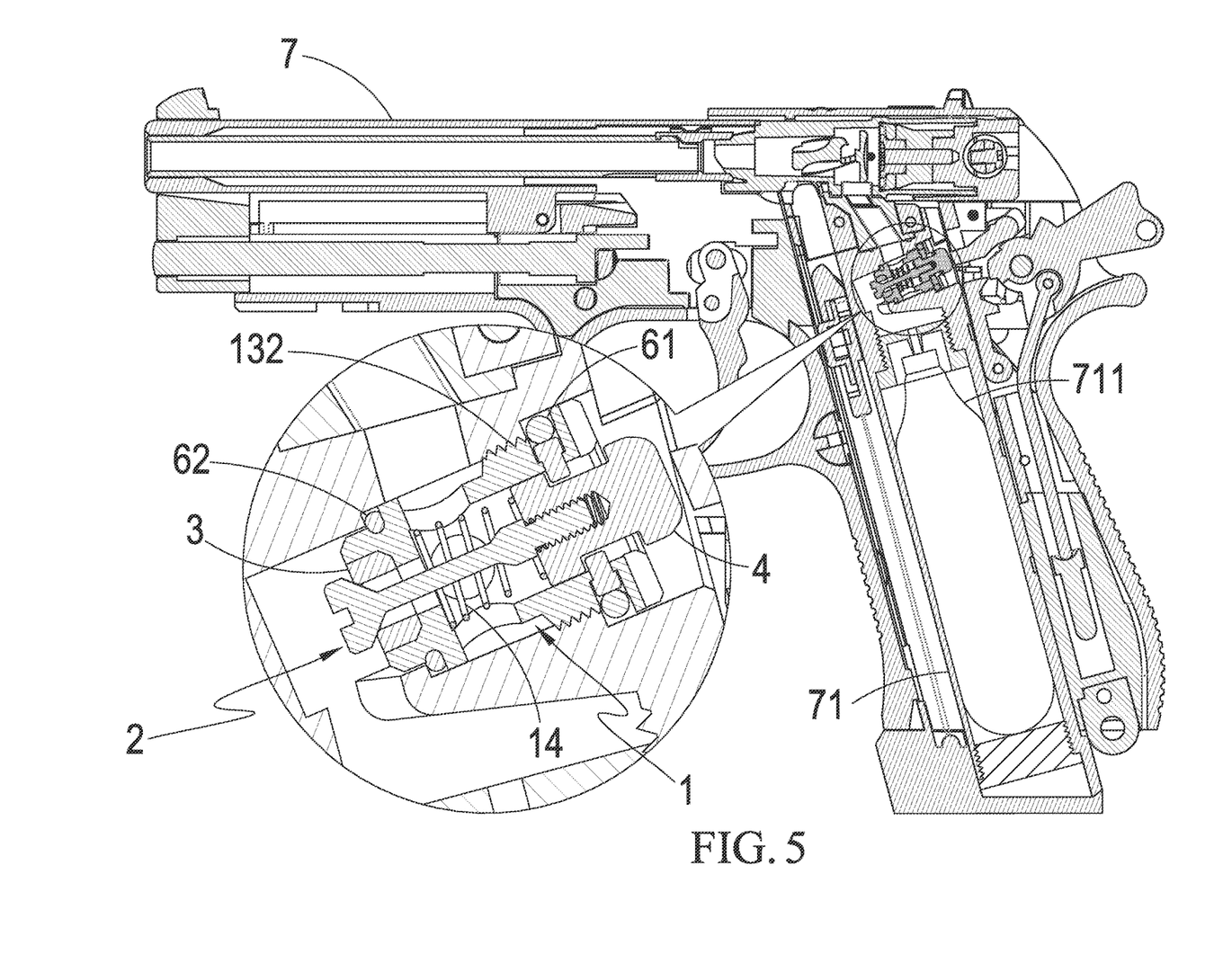
FIG. 5 is a schematic view showing a pneumatic toy gun according to the present invention in an assembled form.

In the instant embodiment, the gas valve body 1 includes a hollow cylindrical structure, which is formed as an integrally formed one-piece structure, having a front segment that forms the gas inlet end portion 11, a middle segment that forms the gas discharge portion 12, and a rear segment that forms the coupling end portion 13. As shown in FIG. 5, the coupling end portion 13 has a surface that is formed with a threaded portion 132 for being mounted in the magazine 71. The coupling end portion 13 has a rear end face that is formed with an operating portion 133. The operating portion 133 can be a straight slot or a crisscross slot for engagement with a screwdriver with which a user may adjust a mounting depth of the coupling end portion 13. Such a screwing and mounting operation allows the first airtight element 61 that is arranged on the coupling end portion 13 and the second airtight element 62 that is arranged on the gas inlet end portion 11 to abut an inside surface of the magazine 71, so that pressurized gas is only allowed to flow in through the gas inlet end portion 11 of the gas valve body 1 and discharge through the gas discharge portion 12. The gas discharge portion 12 includes a circular opening formed in the gas valve body 1. The driving rod 2 has an outside shape that is similar to a funnel and includes a conical end 21 that functions to selectively and tightly press against the leak-sealing element 3 and an elongate stem 22 that is insertable through the gas inlet end portion 11 into the gas valve body 1 to have a rear end portion thereof coupled to the control member 4. The control member 4 includes a solid cylindrical structure having a front end that is screwed to and fixed to the driving rod 2 for movement in synchronization with the driving rod 2 in a front-rear direction and a rear end that is exposed at one side of the coupling end portion 13. Further, the stroke limiting trough 41 is a trough formed as recessing of the driving rod 2, such that the front limiting portion 411 and the rear limiting portion 412 respectively define a front-end wall and a rear-end wall of the stroke limiting trough 41.

Further, the through-aperture portion 131 is an aperture having a diameter that is smaller than the receiving groove 134, and the bearing portion 135 that is of a stepped configuration is formed outside the through-aperture portion 131. The stop element 5 that is disposed in the receiving groove 134 is a T-shaped structure fit in the receiving groove 134, such that the bearing portion 135 may bear and support the stop head 51 that is of an expanded diameter to allow the stop projection 52 to penetrate through the through-aperture portion 131 and project into the stroke limiting trough 41. With such an arrangement, before the first airtight element 61 is installed, such a fitting operation would help to temporarily retain the stop element 5 in position so as to simplify the operation of installation of the stop element 5. The gas inlet end portion 11 is formed, through recessing, with the receiving compartment 111 that has an opening facing frontward in order to receive the leak-sealing element 3 to completely embed inside the receiving compartment 111. The through hole 31 that is formed in a center of the leak-sealing element 3 and the gas inlet opening 112 formed in the bottom of the receiving compartment 111 function to maintain the function of the gas inlet end portion 11 for air ingress. As such, the operation of installation of the leak-sealing element 3 is simplified and due to the leak-sealing element 3 being embedded inside the receiving compartment 111, deformation of the leak-sealing element 3 in an outward direction can be prevented and thus, the spring or elastic force of the leak-sealing element 3 can be completely concentrated at one side of the through hole 31, and a required size of the gas inlet end portion 11 can be reduced.

Figure 6:
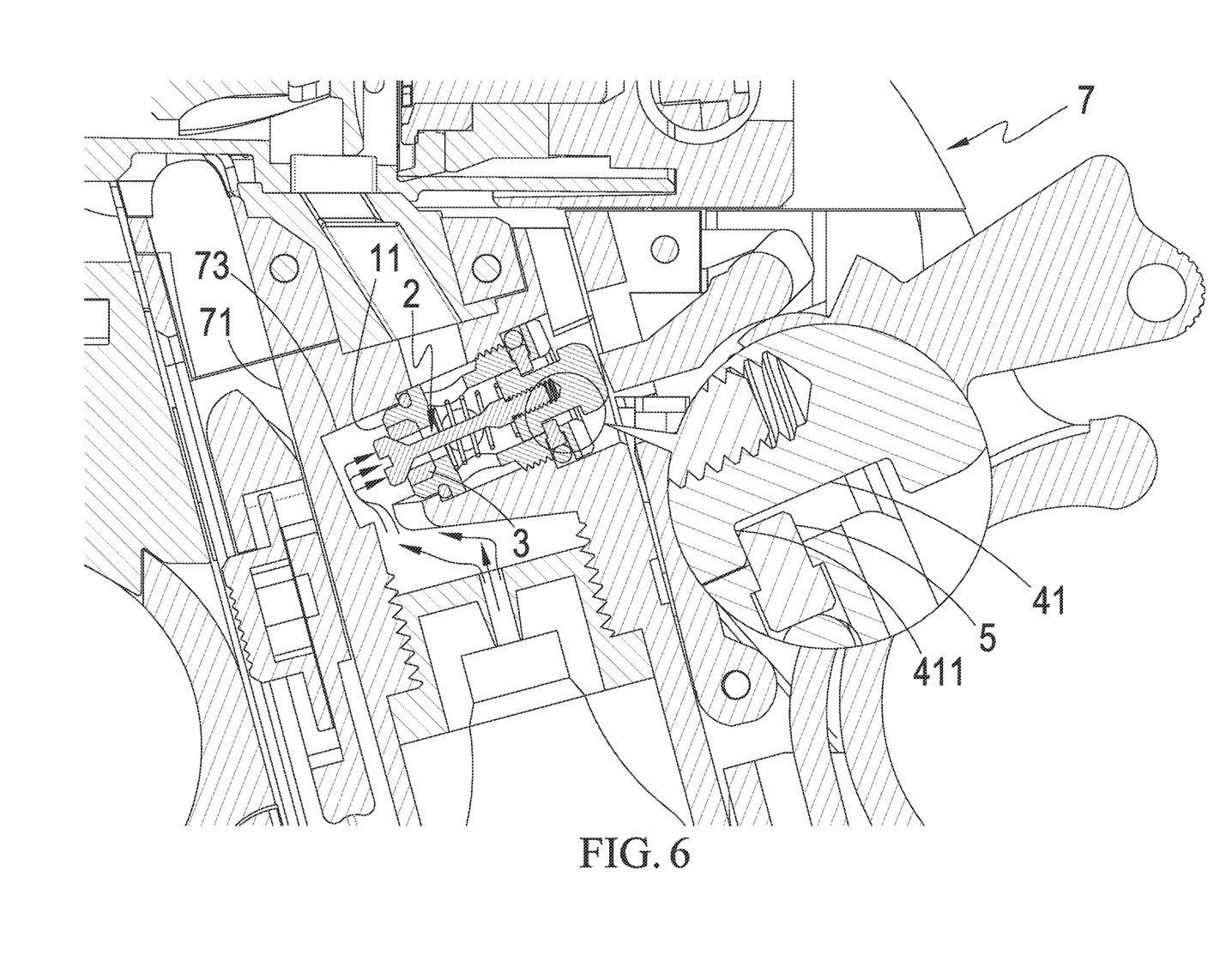
FIG. 6 is a schematic view showing sealing of pressurized gas in the preferred embodiment according to the present invention.
Figure 7:
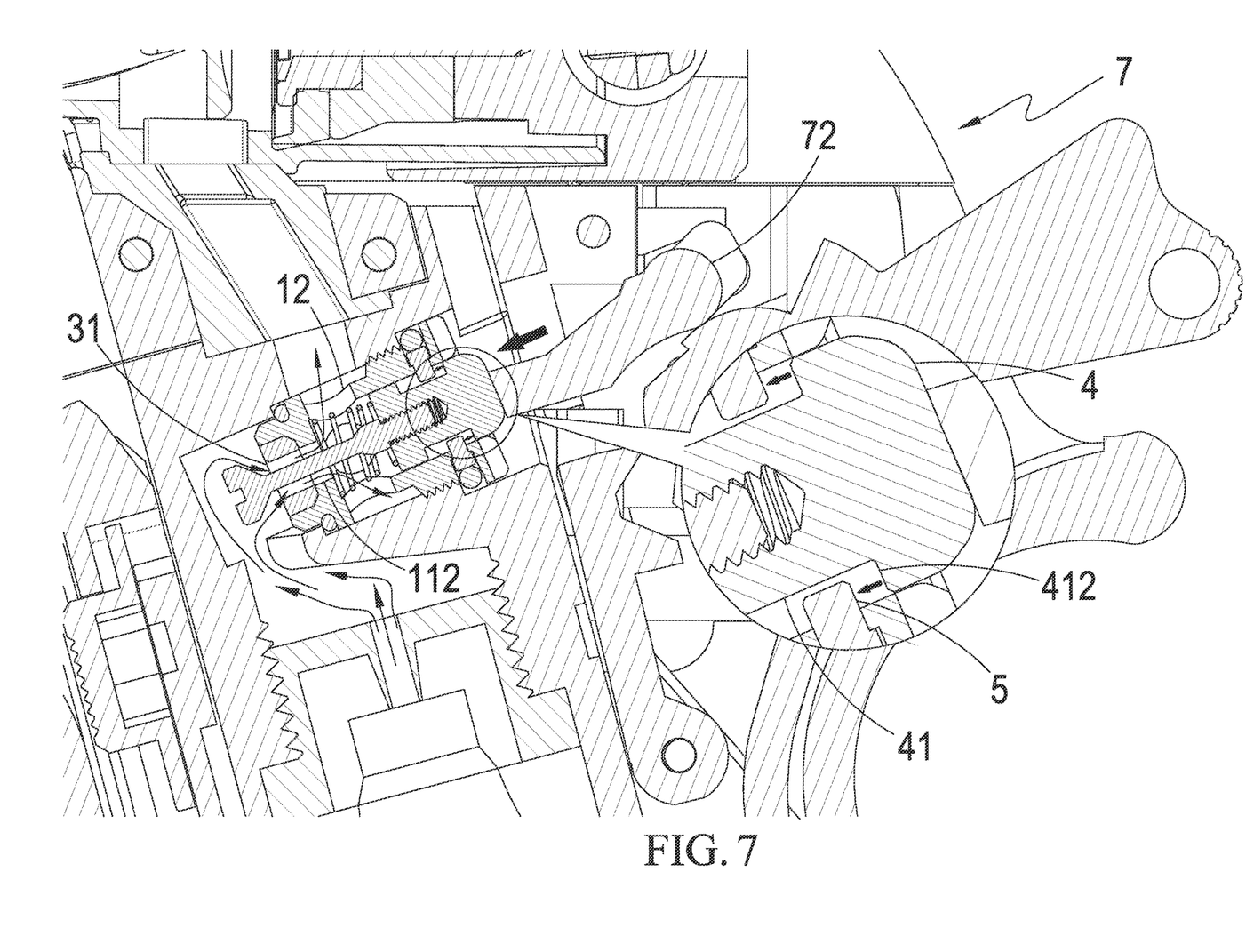
FIG. 7 is a schematic view showing striking of a hammer of the preferred embodiment according to the present invention.

In an actual operation, as shown in FIG. 5, before the pressurized gas canister 711 is provided to supply pressurized gas, the gas valve body 1 uses the elastic element 14 arranged in the interior thereof to push the control member 4 in an outward direction, so that the control member 4 causes the driving rod 2 to move therewith, making the driving rod 2 and the leak-sealing element 3 to jointly close and seal the gas inlet end portion 11. When the pressurized gas canister 711 is installed in the magazine 71, as shown in FIG. 6, the pressurized gas is supplied to fill up the chamber 73 between the gas inlet end portion 11 and the magazine 71, constantly applying a push to the driving rod 2, so that before a firing of the pneumatic toy gun 7, the stop element 5 abuts the front limiting portion 41 of the stroke limiting trough 41 to limit the extent that the control member 4 is pushed outwards by the pressurized gas, and thus controlling a maximum level of the driving rod 2 pressing against the leak-sealing element 3 to prevent the leak-sealing element 3 from being over-compressed for an extended period of time by a pressing force applied by the pressurized gas and thus resulting in elastic fatigue, and as such, the leak-sealing element 3 can be kept to operate in a proper range of extension and compression to ensure excellent airtight sealing effect and extend service life. Further, as shown in FIG. 7, the stop element 5 is arranged such that at the instant when the pneumatic toy gun 7 is firing and the hammer 72 forcibly strikes the control member 4, the stop element 5 abuts the rear limiting portion 412 of the stroke limiting trough 41 to support the striking force of the control member 4, so as to limit the extent of inward movement of the control member 4 as being driven by the hammer 72 and thus, with the gas inlet end portion 11 and the gas discharge portion 12 being not blocked, the pressurized gas is allowed to smoothly pass through the through hole 31 and the gas inlet opening 112 and then the gas is discharged through the gas discharge portion 12 to ensure a minimum quantity of air discharging and achieve the purpose of stabilizing firing strength.

Further, the coupling between the control member 4 and the driving rod 2 is achieved with the mating engagement between the screwing portion 24 and the screwing cavity 42, and the driving rod 2 includes the force-receiving portion 23 of which the diameter is greater than the screwing cavity 42, so as to, firstly, limit the depth with which the screwing portion 24 is screwed into the screwing cavity 42 to thereby control the spacing distance between the conical end 21 of the driving rod 2 and the control member 4, and, secondly, to assist the driving rod 2 to push and move the control member 4 so as to reduce a load of the friction between the screwing portion 24 and the screwing cavity 42, to thereby increase the service life thereof. Similarly, the thread-free buffering portion 25 is a smooth, thread-free portion between the screwing portion 24 and the force-receiving portion 23, which, after the screwing portion 24 has been screwed in, allows the force-receiving portion 23 to be situated closer to the screwing cavity 42 to more effectively exploit the function of the force-receiving portion 23. The screwing buffer section 43 is a space preserved in the control member 4 for screwing and mounting purpose in order to ensure that the screwing portion 24 can be completely screwed into the screwing cavity 42 and to ensure that the force-receiving portion 23 can be placed to abut the screwing cavity 42.

Figure 8:
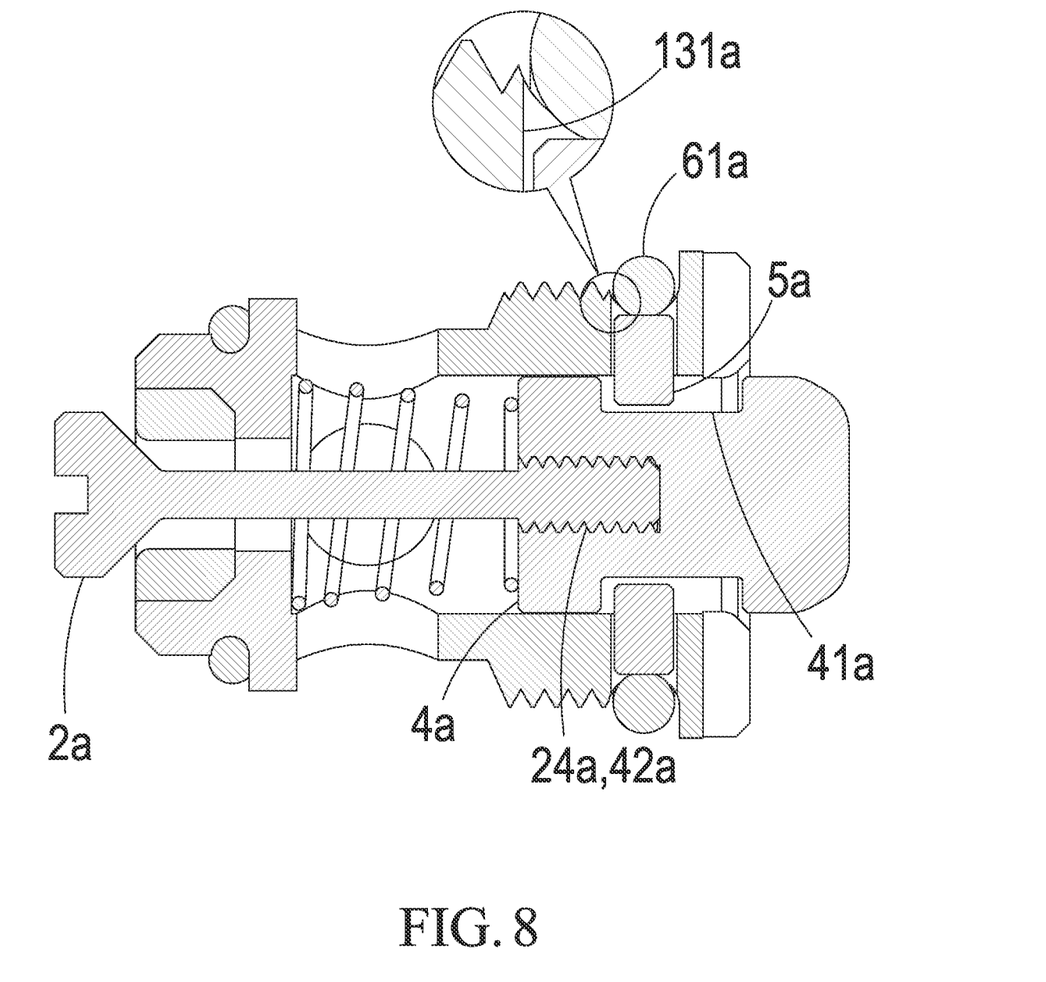
FIG. 8 is a cross-sectional view showing another preferred embodiment according to the present invention.

Referring further to FIG. 8, the instant embodiment is such that the stop element 5a is arranged as a cylindrical structure of which a part is located in the through-aperture portion 131a while a part is located in the stroke limiting trough 41a. In this instant, the stop element 5a uses an outer side thereof to directly retain the first airtight element 61a in position, while an inner side is to be limited by the stroke limiting trough 41a. In this way, the structure of the component is simplified, while the same function of the stop element 5a can be fulfilled. And also, the structure for coupling the control member 4a with the driving rod 2a is simplified by directly using the screwing portion 24a to couple and drive the screwing cavity 42a to move, and to similarly provide the operative moving connection between the control member 4a and the driving rod 2a. This is provided to demonstrate the diversification and flexibility of the present invention in respect of structure.

I claim:

1. A toy gun magazine constant gas flow valve structure, which is adapted to be coupled to a magazine of a pneumatic toy gun, mainly comprising:
   a gas valve body, which is fixed in an interior of the magazine, the gas valve body comprising a gas inlet end portion, a gas discharge portion formed at one side of and in communication with the gas inlet end portion, and a coupling end portion formed at one side of the gas discharge portion for coupling with the magazine;
   a driving rod, which movably disposed in the gas valve body and connected to one side of the gas inlet end portion;
   a leak-sealing element, which is arranged on the gas inlet end portion and collaborating with the driving rod in closing the gas inlet end portion;
   a control member, which is movably disposed in the gas valve body and connected to an end of the driving rod that is distant from the leak-sealing element;
   at least one stroke limiting trough, which is formed on the control member, the stroke limiting trough having sidewalls that comprise a front limiting portion formed on a sidewall adjacent to the driving rod and a rear limiting portion formed on another sidewall distant from the driving rod; and
   at least one stop element, which is disposed on the coupling end portion and projecting into the stroke limiting trough to get contactable with the front limiting portion or the rear limiting portion to control movement of the driving rod.

2. The toy gun magazine constant gas flow valve structure according to claim 1, wherein the coupling end portion comprises at least one through-aperture portion, and the stop element is disposed in the through-aperture portion, a first airtight element being provided at one side of the stop element that is distant from the stroke limiting trough.

3. The toy gun magazine constant gas flow valve structure according to claim 1, wherein the coupling end portion is provided with at least one receiving groove, the receiving groove having a bottom that is formed with a through-aperture portion and a bearing portion formed outside the through-aperture portion.

4. The toy gun magazine constant gas flow valve structure according to claim 3, wherein the stop element comprises a stop head that is supported by the bearing portion and a stop projection formed at one end of the stop head, a first airtight element being arranged at one side of the stop head that is distant from the stop projection, the stop projection being received in and extending through the through-aperture portion to be located in the stroke limiting trough.

5. The toy gun magazine constant gas flow valve structure according to claim 1, wherein the gas inlet end portion is formed with a receiving compartment, the receiving compartment having a bottom that is formed with a gas inlet opening, the leak-sealing element being embedded in the receiving compartment, the leak-sealing element being formed with a through hole in communication with the gas inlet opening.

6. The toy gun magazine constant gas flow valve structure according to claim 1, wherein an end of the control member connected to the driving rod comprises a screwing cavity, the end of the driving rod connected to the control member comprising a force-receiving portion and a screwing portion that is formed as projecting from the force-receiving portion and is coupled with the screwing cavity, the force-receiving portion being in abutting engagement with an opening of the screwing cavity.

7. The toy gun magazine constant gas flow valve structure according to claim 6, wherein a thread-free buffering portion is formed between the force-receiving portion and the screwing portion.

8. The toy gun magazine constant gas flow valve structure according to claim 6, wherein the screwing cavity has a depth that is greater than a length of the screwing portion, and a screwing buffer section is defined inside the screwing cavity.

* * * * *